SUPERCONDUCTIVE OSCILLATOR CIRCUITS

Filed Dec. 29, 1961 5 Sheets-Sheet 1

INVENTORS
EUGENE S. SCHLIG
HAROLD SOBOL

BY Thomas & Crickenberger
ATTORNEYS

United States Patent Office 3,253,232

Patented May 24, 1966

3,253,232
SUPERCONDUCTIVE OSCILLATOR CIRCUITS

Harold Sobol, Peekskill, and Eugene S. Schlig, Ossining, N.Y., assignors to International Business Machines Corporation, New York, N.Y., a corporation of New York Filed Dec. 29, 1961, Ser. No. 163,107
10 Claims. (Cl. 331—107)

This invention relates to oscillator circuits and more specifically to such circuits wherein superconductive components are employed.

According to one aspect of this invention a superconductive oscillator circuit is provided wherein cryotrons are employed.

According to another aspect of this invention superconductive oscillator circuits are provided wherein crossed-film cryotrons and in-line cryotrons are employed.

A class of oscillator circuits are provided according to this invention which employ superconductors as the active element and resonant circuits to determine the frequency of oscillation. The waveform is substantially sinusoidal, depending on the specific circuit configuration and parameters. Some advantages of this class of oscillator circuits are their operation in the same temperature environment as other cryogenic circuits and devices with which the oscillators may be employed. Another advantage of these oscillator circuits is their fabricability along with the other devices and circuits with which the oscillators may be used. A still further advantage accrues because the same methods may be employed to fabricate both the oscillator circuit and the associated devices and circuits with which it is employed.

It is another feature of this invention to provide oscillator circuits using L–C circuit elements for determining the resonant frequency.

It is a further feature of this invention to provide oscillator circuits which use a resonant element such as a tuned line to determine the resonant frequency.

Figure 1:
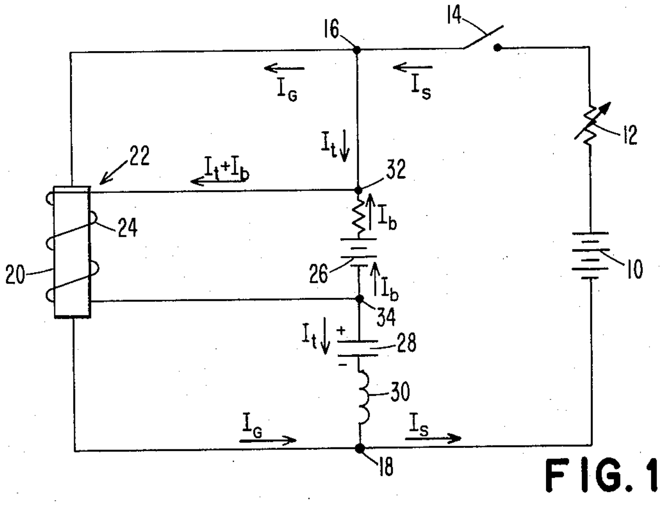
Figure 5:
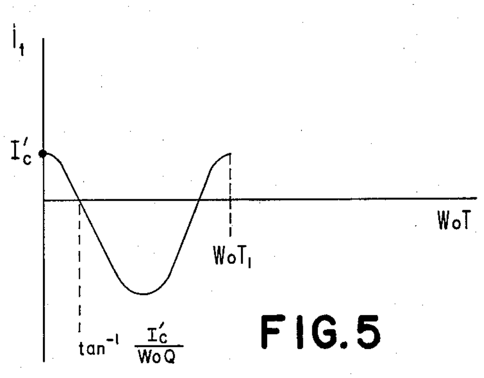
Figure 6:
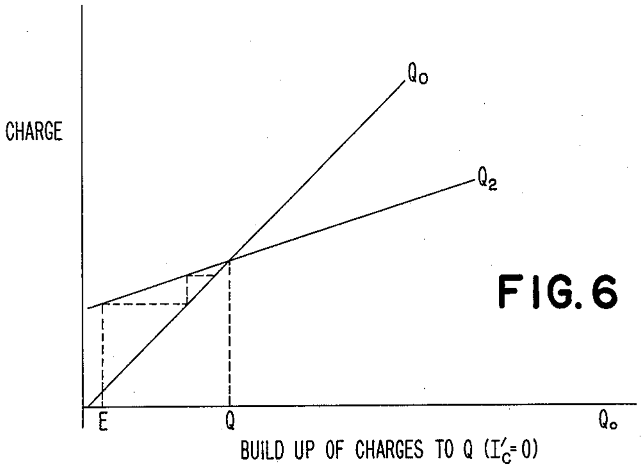
Figure 7:
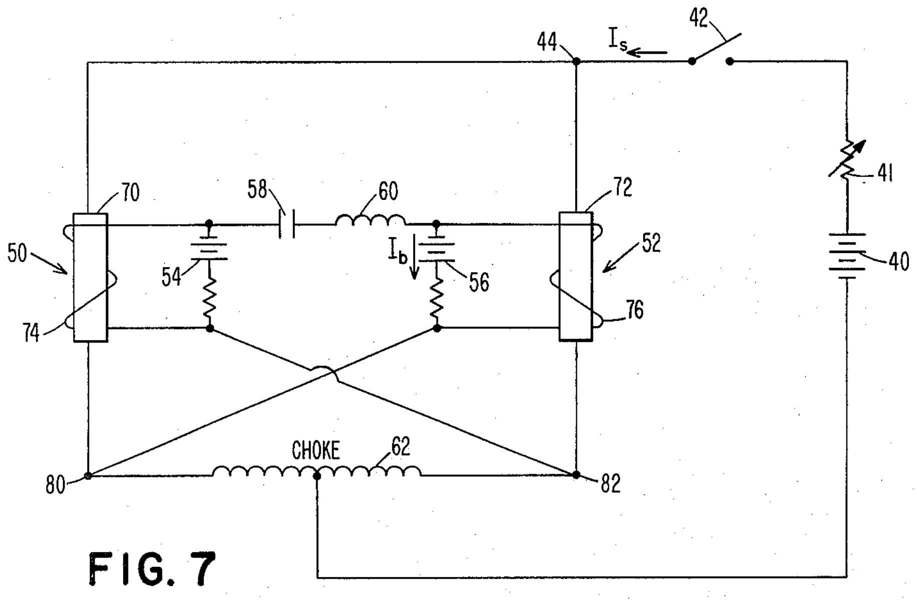
Figure 8:
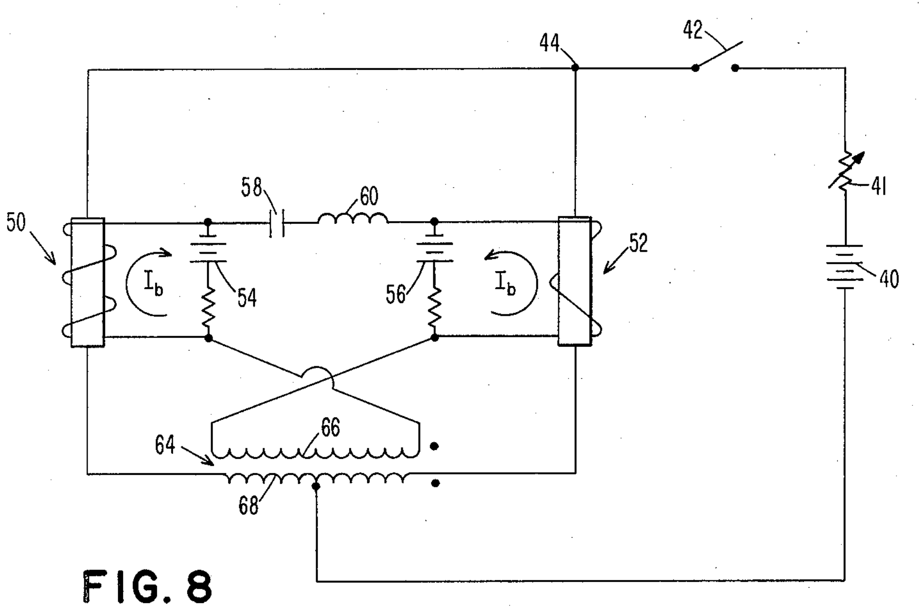
Figure 9:
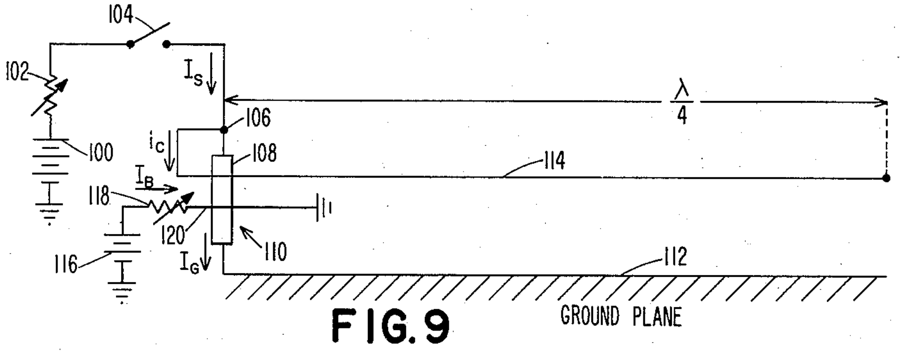
Figure 10:
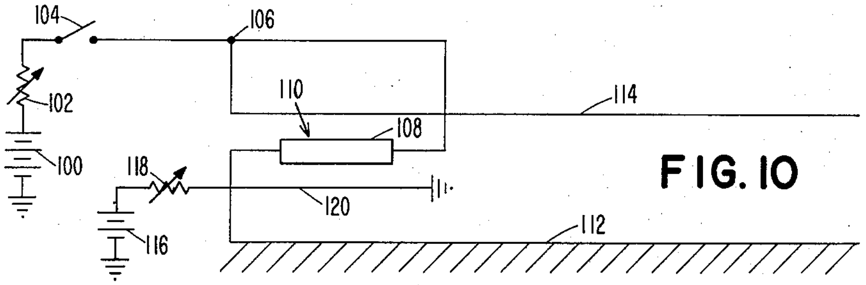
Figure 11:
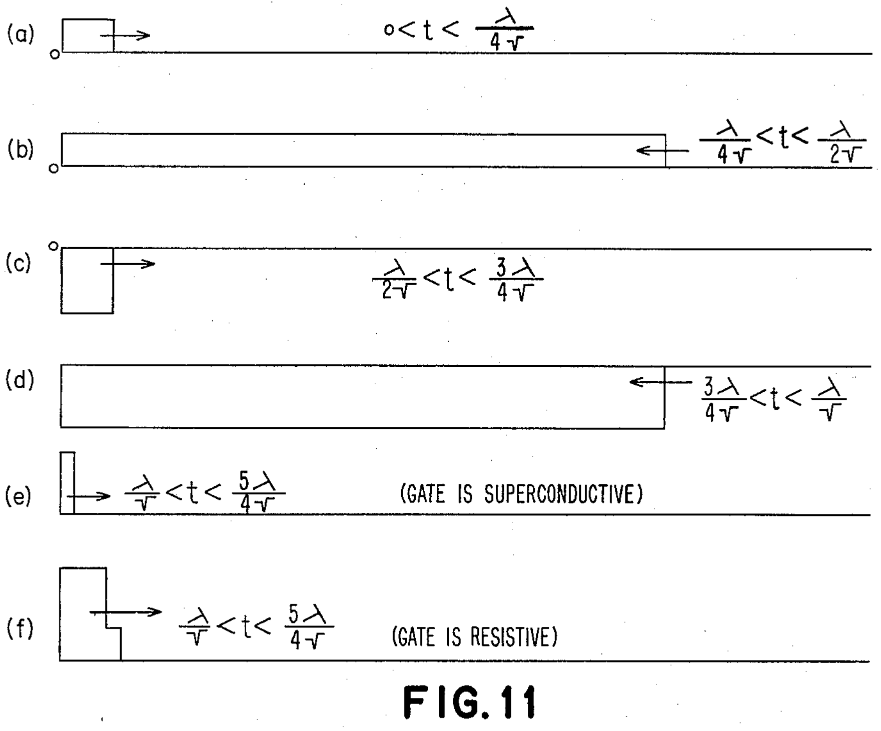
Figure 12:
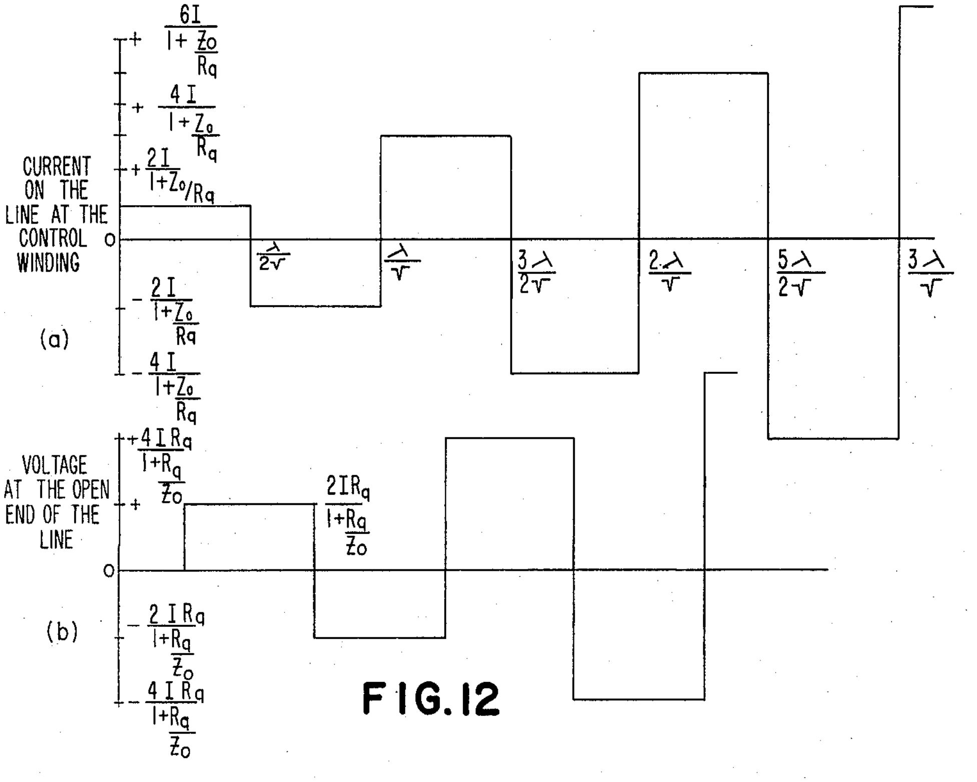
Figure 13:
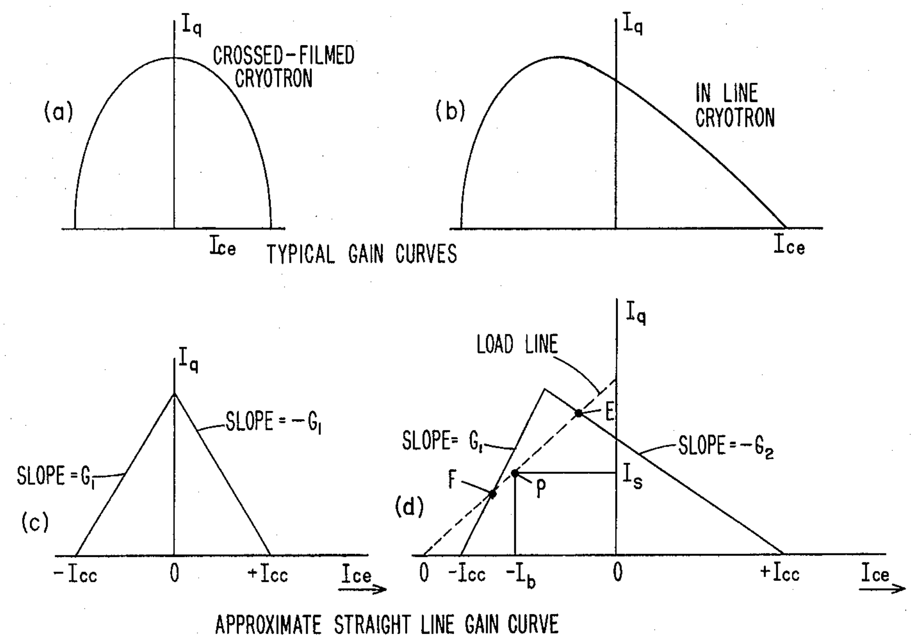

The foregoing and other objects, features and advantages of the invention will be apparent from the following more particular description of preferred embodiments of the invention, as illustrated in the accompanying drawings in which:

FIGURE 1 illustrates one arrangement of an L-C oscillator according to this invention, FIGURES 2*a* and 2*b*, 3*a* and 3*b*, 4, 5, and 6 show curves which help to illustrate the operation of the oscillator circuit of FIGURE 1, FIGURES 7 and 8 illustrate additonal L–C oscillator circuits according to this invention, FIGURES 9 and 10 illustrate oscillator circuits according to this invention which utilize transmission lines as the frequency determining element, and FIGURES 11, 12 and 13 show curves which help to illustrate the operation of the oscillator circuits of FIGURES 9 and 10.

Reference is made to FIGURE 1 for a description of a cryogenic oscillator according to this invention wherein the resonant frequency is determined by an L-C circuit. A source of direct current 10 is connected through a variable resistor 12 to a switch 14 as shown. Resistor 12 is sufficiently large compared to the impedance of the rest of the circuit that the current $I_s$ is a substantially constant current. Current from the battery 10 is designated as $I_s$, and it flows to a junction point 16. Between the junction point 16 and 18 are two parallel circuits. One parallel circuit includes a gate 20 of a cryotron 22, and the other parallel circuit includes a control winding 24 of the cryotron 22 in parallel with a current source formed by a resistor and battery 26, a capacitor 28 and inductance here represented by coil 30. The current $I_s$ from the battery 10 divides at the junction point 16 into two components $I_g$ and $I_t$. The current $I_g$ is the current which passes through the gate element 20 of the cryotron 22, and the current $I_t$ is the current which passes through the tank circuit composed of the condenser 28 and the coil 30.

All interconnecting lines as well as the control winding 24, the condenser 28 and the coil 30 are fabricated of a hard superconductive material while the gate element 20 is fabricated of a soft superconductive material. The source of current 10 supplies operating current to the circuit shown, and the source current 26 supplies a bias current to the cryotron 22.

When oscillatory currents are desired, the switch 14 is closed and current $I_s$ is supplied to the junction point 16. The quiescent path of the direct current $I_s$ is in the parallel branch containing the gate element 20. Assume that a portion of this current $I_t$ is transiently diverted to the junction point 32 in the parallel branch including tank circuit. The current $I_t$ flowing to the junction point 32 and the current $I_b$ flowing to the same point combine in an aiding direction, and they are applied to the control winding 24 of the cryotron 22. These combined currents flow to the junction point 34 at which point the current $I_t$ flows through the condenser 28 and the coil 30 to the junction point 18 while the current $I_b$ flows to the battery 26. The current $I_t$ and the current $I_g$ combine at the junction point 18 and flow as current $I_s$ back to the battery 10. Iet it be assumed that the total current through the control winding 24 of the cryotron 22 creates a magnetic field on the gate element 20 which is greater than the critical magnetic field of the gate. This drives resistive the gate element 20, thereby diverting more of the battery current $I_s$ to the parallel circuit including the tank circuit. This charges the capacitor 28, but as the capacitor 28 acquires a maximum charge, the current $I_t$ is diminished. As soon as the current $I_t$ is reduced to a value such that the sum of the current $I_t$ and the current $I_b$ are less than the critical current of the cryotron 22, the gate element 20 reverts to its superconductive state, and the current $I_g$ again flows through the superconductive gate 20. The resultant wave form of the current in the tank circuit during the period that the gate element 20 is resistive is that of a damped sinusoidal oscillation. The wave form of the current in the tank circuit during the period that the gate element 20 is superconductive is approximately that of an undamped sinusoidal oscillation. The amplitude of the oscillatory energy may build up because the energy supplied from the source of working current 10 during that part of the cycle when the gate element 20 is resistive may be made to be greater than the energy dissipated.

It may be shown that the energy in the resonant circuit is increasing at any instant when the gate element 20 is resistive and the tank circuit current $I_t$ is positive and less than the supply current $I_s$. This neglects dissipation other than that of the resistive gate and the effects of loading the tank circuit. The bias current is necessary to prevent the gate element 20 from becoming resistive during the negative half cycles. In this connection it is pointed out that when the condenser 28 is discharging, the tank current $I_t$ opposes the bias current $I_b$. Thus the bias current $I_b$ is made sufficiently great in amplitude to prevent the oscillatory currents on the negative half cycles from driving the gate element 20 into its resistive state.

Incremental gain in the cryotron is necessary to switch the gate from its superconductive state to the resistive state and vice versa for the purpose of maintaining oscillations. The resistance-field transition may be quite abrupt, but absolute abruptness is not essential since other modes of operation may occur where a slow or sloping transition takes place.

Sources of dissipation other than the gate resistance, such as dielectric losses in the capacitor and interconnecting lines and loading of the tank circuit, will somewhat modify the operation of the circuit and the conditions for buildup. Nevertheless, the total waveform of the oscillator circuit is approximately sinusoidal, the deviation from sinusoidiality arising from the existence of resistance in the gate during part of the cycle and its absence during the remainder of the cycle.

At this point it is convenient to analyse the circuit in FIGURE 1 and demonstrate a proof of its validity as an oscillation generator. For this purpose the direct current $I_s$ is considered energy supplied to the circuit; the instantaneous tank current is designated $i_t$; the gate current is $I_s - i_t$ which is designated $i_g$; and the resistance of the gate 20 when switched is arbitrarily designated $R_g$. Other symbols are defined as they are introduced subsequently.

In order that oscillation be building up or maintaining itself at any instant, it is essential that the energy supplied be equal to or greater than the energy dissipated by $R_g$. It is demonstrated hereafter how this affects the circuit parameters.

$$\text{Energy supplied} \geqq \text{energy dissipated}$$

$$I_s i_g R_g \geqq i_g^2 R_g$$

If $i_g$ is positive, this relation becomes $$I_s \geqq i_g$$

(If $i_g$ is negative, energy is lost unless $I_s$ is reversed.)

The conditions reduce to (1) $$i_g > O$$

or $$I_s > i_t$$

(2) $$I_s \geqq i_g$$

or $$i_t \geqq O$$

Combined, we see that for buildup or maintenance, $$O \leqq i_t < I_s$$

is necessary when the gate is resistive.

The above implies that the cryotron be made to switch only when $i_t$ is positive and that the switching point be at a value of $i_t$ less than $I_s$. The bias current $I_b$ must have a polarity such that it aids $i_t$ in the control winding 24 during the positive swing of $i_t$. Furthermore the critical value of $i_t$, which will be called $I_c'$, must be less than $I_s$. $I_c'$ may be defined as $$I_c' = I_c - I_b$$

Here $I_c$ is the actual critical control current of the cryotron at a gate current of $I_s - I_c'$.

Figures 2A, 2B:
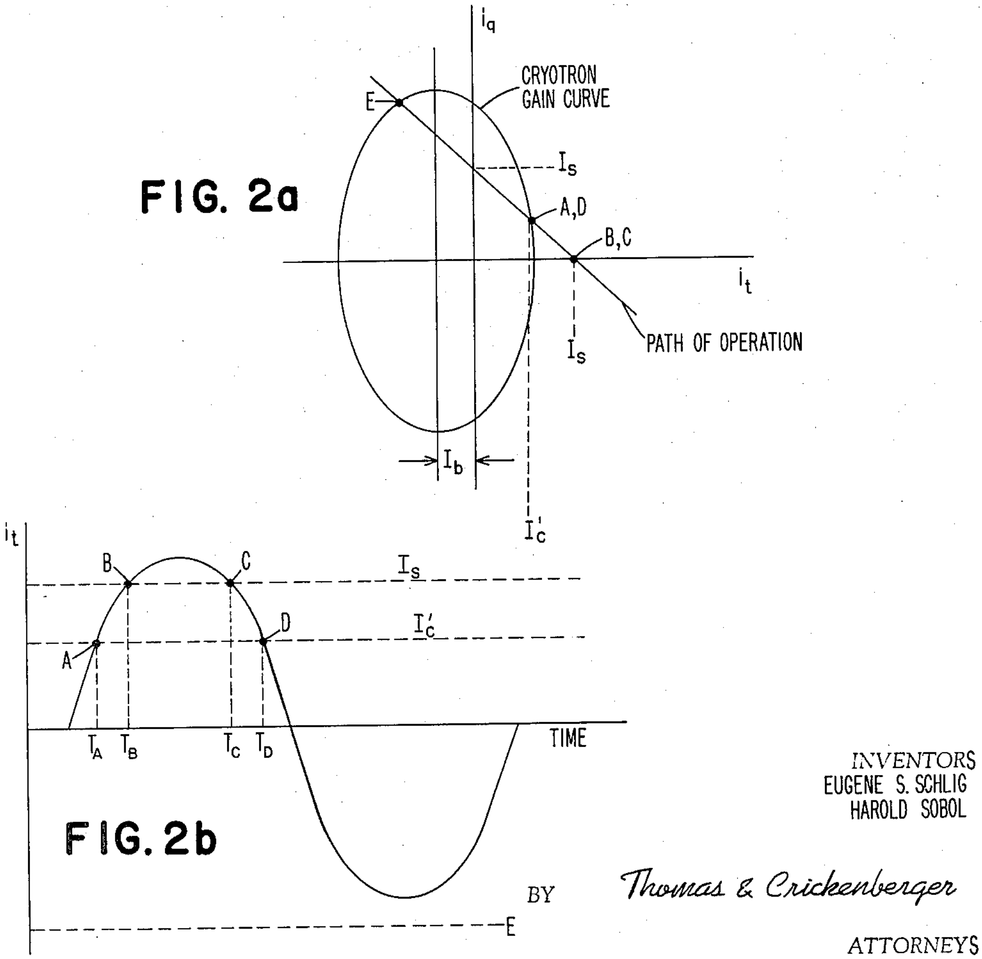

It is helpful to observe the plot of the path of operation of the circuit on a cryotron gain curve, and this is illustrated in FIGURE 2*a*. The axes represent $i_g$ and $i_t$ as shown, and the major axis of the elliptical gain curve is shifted left by the amount $I_b$. The locus of operation is the straight line $$i_g = I_s - i_t$$

which interesects each axis at $I_s$.

It may be immediately seen that, in order that resistance be introduced for increasing $i_t$ at positive values of $i_t$ and $i_g$, incremental gain greater than one is essential.

The letters A through E relate points on the diagram to points on the sinusoidal variation of $i_t$ shown in FIGURE 2*b*. Note that it is possible with the cryotron shown for $i_t$ to exceed $I_s$ on the positive swing for a lower amplitude than that for which it reaches the critical value, point E, on the negative swing. In this case, amplitude limiting of the oscillation would occur due to the reversal of $i_g$ in the resistive gate. Were point E reached first, limiting would occur due to switching of the gate to a resistive condition when $i_t$ is negative.

The analysis below will assume the former is the case, since limiting by gate current reversal is linear in the sense that it does not involve parameter changes, and so it does not introduce distortion of the waveform. This limiting mechanism is implied in the mathematical treatment below, and it will give rise in the results to a stable value of peak oscillation current.

Since the circuit resistance assumes the constant value zero for a range of values of $i_t$, and another constant value $R_g$ for the remainder of the range of $i_t$, a piecewise linear analysis may be performed. For this purpose reference is made to the waveforms of FIGURES 3*a* and 3*b*.

Figure 3:
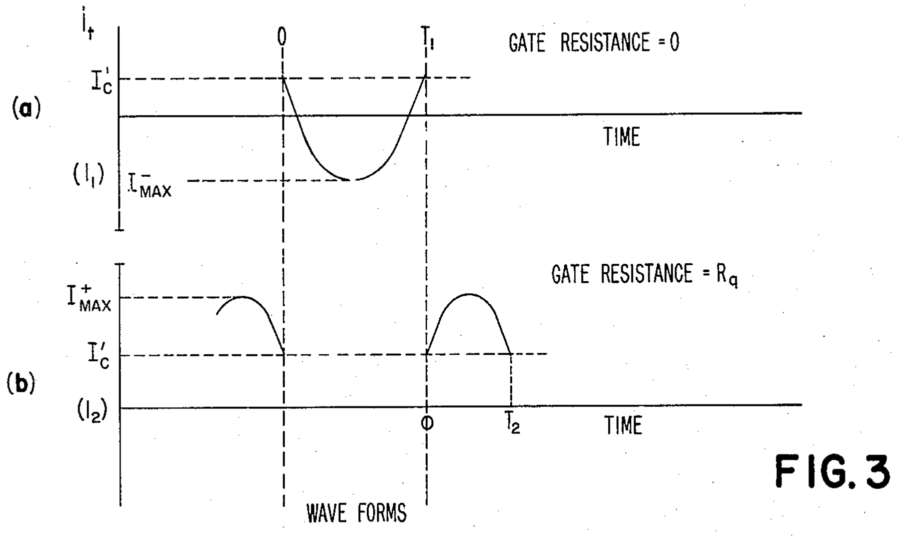

First, consider that part of the oscillation cycle shown in FIGURE 3*a* for which $i_t < I_c'$ and the gate resistance is zero. The waveform of $i_t$ is constrained to be that of an undamped sine wave since the loop in which it flows contains only L and C. For this part of the cycle $i_t$ is designated $I_1$ to distinguish the solutions for the two linear pieces.

At $t=0$ assume $i_1$ equals $I_c'$ and, since it is desired to obtain a negative $$\frac{di_1}{d_t}$$

initially, let the initial charge on C be assumed to be a positive value $Q_0$.

The Laplace transform equation for the circuit is:

$$\frac{1}{CS}(Q_0 + I_1(S)) + LSI_1(S) - LI_c' = O$$

$$I_1(S) = I_c' \frac{S - \frac{Q_0}{LCI_c'}}{S^2 + \frac{1}{LC}}$$

By defining $$\sqrt{\frac{1}{LC}}$$

as $\omega_0$ as is usual, the inverse transform is found to be:

1*A* $$i_1 = I_c'\left[\cos \omega_0 t \frac{Q}{I_c'}\omega_0 \sin \omega_0 t\right]$$

or

1*B* $$i_1 = -I_c'\sqrt{\left(\frac{\omega_0 Q_0}{I_c'}\right)^2 + 1}\,\sin\left[\omega_0 t - \tan^{-1}\left(\frac{I_c'}{\omega_0 Q_0}\right)\right]$$

The next point of interest on the wave form is that at which $i_1$ again equals $I_c'$ which will occur at time $T_1$. At time $T_1$, (2A) $$I_c' = I_c' \cos \omega_0 T_1 - Q_0 \omega_0 \sin \omega_0 T_1$$

which yields

2*B* $$Q_0 = \frac{I_c'}{\omega_0}\left[\frac{\cos \omega_0 T_1 - 1}{\sin \omega_0 T_1}\right]$$

The division by $\sin \omega_0 T_1$ eliminates the trival $T_1 = 0$ solution. This equation relates $T_1$ to $Q_0$ Next the charge $Q_1$ at $T_1$ is found.

$$Q_1 = Q_0 + \int_0^{T_1} i_1(t)\,dt$$

$$Q_1 = Q_0 + I_c'\int_0^{T_1}\left[\cos \omega_0 t - \frac{Q_0}{I_c'}\omega_0 \sin \omega_0 t\right]dt$$

(3) $$Q_1 = Q_0\left[\cos \omega_0 T_1 + \frac{I_c'}{\omega_0 Q_0}\sin \omega_0 T_1\right]$$

Substitution (2B) into (3), $$Q_1 = \frac{I_c'}{\omega_0}\left(\frac{1 - \cos \omega_0 T_1}{\sin \omega_0 T_1}\right) = -Q$$

(4) $$Q_1 = -Q_0$$

This result might have been obtained directly from the symmetry of the sinusoidal waveform, by observing that the slope at $t=0$ is the negative of that at $T_1$ and that the charge is proportional to the rate of change of current in a loop containing only L and C.

From the foregoing the initial conditions have been found for that portion of the cycle shown in FIG. 3*b* for which the gate has resistance $R_g$. For this part of the cycle $i_t$ is designated $I_2$ to distinguish the solutions for the two linear pieces under consideration. The Laplace transform equation for the current on a new time scale starting from $t=0$ in FIGURE 3*b* is:

$$\frac{1}{CS}(Q_1+I(S))+LSI(S)-LI_c'+R_gI(S)-\frac{R_gI_s}{S}=0$$

$$I(S)=I_c'\frac{S+\left(\frac{R_g}{L}\frac{I_s}{I_c'}-\frac{Q_1}{LCI_c'}\right)}{S^2+\frac{R_g}{L}S+\frac{1}{LC}}$$

An oscillatory solution is assumed, $$\left(\text{that is, } \frac{R^2}{4L^2}<\frac{1}{LC}\right)$$

so that the wave form will remain as nearly sinusoidal as possible.

The transform is:

$$I(S)=I_c'\frac{S+a_0}{(S+\alpha)^2+\beta^2}$$

Where $$a_0=\frac{R_g}{L}\frac{I_s}{I_c'}-\frac{Q_1}{LCI_c'}$$

$$\alpha=\frac{R_g}{2L}$$

$$\beta=\sqrt{\frac{1}{LC}-\frac{R_g^2}{4L^2}}$$

In these terms, the inverse transform for the current $i_2$ is:

(5A) $$i_2=I_c'e^{-\alpha t}\left[\cos \beta t+\frac{a_0-\alpha}{\beta}\sin \beta t\right]$$

or (5B) $$i_2=I_c'\frac{[(a_0-\alpha)^2+\beta^2]^{1/2}}{\beta}e^{-\alpha t}\sin\left[\beta t+\tan^{-1}\frac{\beta}{a_0-\alpha}\right]$$

As before, let $i_2-I_c'$ (using 5A) at time $T_2$ (6A) $$I_c'=I_c'e^{-\alpha T_2}\left[\cos \beta T_2+\frac{a_0-\alpha}{\beta}\sin \beta T_2\right]$$

and solve for the value of $Q_1$ for which $i_2=I_c'$ at $T_2$ (6B) $$Q_1=\frac{\beta I_c'}{\alpha^2+\beta^2}\frac{\cos \beta T_2}{\sin \beta T_2}-\frac{\beta I_c'}{\alpha^2+\beta^2}\frac{1}{e^{-\alpha T_2}\sin \beta T_2}-\frac{\alpha I_c'}{\alpha^2+\beta^2}+\frac{\alpha(2I_s)}{\alpha^2+\beta^2}$$

The charge at time $T_2$ in FIGURE 3*b* is:

$$Q_2=Q_1+\int_0^{T_2}i_2dt=Q_1+\Delta Q$$

where, using Equation 5A, (7) $$\begin{cases}\Delta Q=\int_0^{T_2}i_2dt=Q_1\left[\frac{\alpha}{\beta}e^{-\alpha T_2}\sin \beta T_2+e^{-\alpha T_2}\cos \beta T_2-1\right]\\ -2I_s\left[\frac{\alpha^2}{\beta(\alpha^2+\beta^2)}e^{-\alpha T_2}\sin \beta T_2+\frac{\alpha}{\alpha^2+\beta^2}e^{-\alpha T_2}\cos \beta T_2\right.\\ \left.-\frac{\alpha}{\alpha^2+\beta^2}\right]+I_c'\frac{1}{\beta}e^{-\alpha T_2}\sin \beta T_2\end{cases}$$

Note from Equations 1B and 5B that the amplitudes of $i_1$ and $i_2$ are directly dependent on $Q_0$ which is the negative of $Q_1$. Since all other quantities are constant, it can be seen that the amplitude of current is constant from cycle to cycle if $Q_2=Q_0$, and the amplitude builds up if $Q_2>Q_0$. A relationship must be found among the circuit parameters and currents such that $$Q_2=Q_1+\Delta Q=\Delta Q-Q_0\geqq Q_0$$

or (8) $$\Delta Q\geqq 2Q_0$$

Substitute Equation 7 into Equation 8 and using $Q_0=-Q_1$ in Equation 7, extensive simplification yields:

$$\left(1-\frac{I_c'}{2I_s}\right)2\alpha\beta\sin \beta T_2-\beta^2\frac{I_c'}{2I_s}(e^{+\alpha T_2}-e^{-\alpha T_2})\geq 0$$

$$\left(1-\frac{I_c'}{2I_s}\right)2\alpha\beta\sin \beta T_2-2\beta^2\frac{I_c'}{2I_s}\sinh \alpha T_2\geq 0$$

Since the second term will be positive, $$\frac{\alpha}{\beta}\left[\frac{1-\frac{I_c'}{2I_s}}{\frac{I_c'}{2I_s}}\right]\sin \beta T_2\geq \sinh \alpha T_2$$

For convenience define $$i_c'=\frac{I_c'}{2I_s}$$

so (9) $$\frac{\alpha}{\beta}\left(\frac{i-i_c'}{i_c'}\right)\sin \beta T_2\geq \sinh \alpha T_2$$

Figure 4:
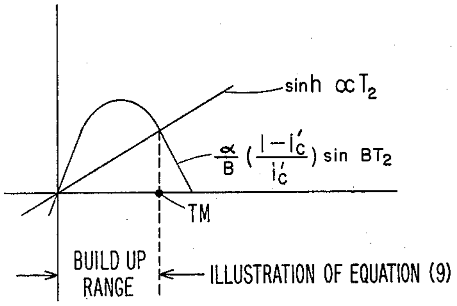

Looking at the relationship of Equation 9 graphically illustrated in FIGURE 4, it is seen that the condition stated will exist for a range of the variable $T_2$ between 0 and $T_m$ in FIGURE 4 provided the initial slope at $T_2=0$ of the left-hand term of Equation 9 exceeds that of the right-hand term. This is necessarily satisfied since, referring to FIGURE 2*a*, $I_c'$ must be less than $I_s$ for resistance to occur at position $i_g$. The maximum value $i_c'$ is then 0.5, so the minimum value of $$\frac{1-i_c'}{i_c'}$$

is then unity. The initial slope of the right-hand term is alpha and that of the left-hand term must be greater than alpha, satisfying the condition for a positive range of $T_2$ in FIGURE 4 over which Equation 9 holds.

It has now been found that the oscillation amplitude will build up if the duration of the resistive part of the cycle is less than a value $T_m$ defined by

(10) $$\frac{\alpha}{\beta}\left(\frac{1-i_c'}{i_c'}\right)\sin \beta T_m=\sinh \alpha T_m$$

For given natural frequency, parameters, and supply currents, the value of $T_2$ increases as the amplitude of oscillation increases. For small oscillatory amplitudes such that $T_2<T_m$, the amplitude grows; however, for larger oscillatory current amplitudes such that $T_2>T_m$, the oscillatory current amplitude will decay. The oscillation current amplitude then seeks a value such that $T_2=T_m$ whereby a stable steady state amplitude of oscillation can exist without the necessity of switching the cryotron in the negative half cycle.

"Hunting" of the stable point, causing an oscillatory envelope, does not occur, if $Q_2$ is a monotonically increasing function of $Q_0$ in the range of interest as is the case here.

Now the stable amplitude of the positive and negative half cycles can be found as well as the period of oscillation as functions of the parameters.

The amplitude of the negative (free) half cycle, from (1B), is $$\overline{I_m} = -\sqrt{(\omega_0 Q)^2 + (I_c')^2}$$

Where Q is the stable value of $Q_0$ found from (6B) using (4) and $T_2 = T_m$.

The exact amplitude of the positive (driven) half cycle is found by obtaining the first maximum of Equation 5B by differentiation:

$$I_m^+ = I_c' \sqrt{\frac{(a_0-\alpha)^2+\beta^2}{\alpha^2+\beta^2}}(e^{-\alpha T_p})$$

where $$T_p = \sqrt{\frac{1}{\alpha^2+\beta^2}} - \frac{1}{\beta}\tan^{-1}\frac{\beta}{a_0-\alpha}$$

$T_2$ is already known, but the period of the free swing, $T_1$ must be found.

Referring to FIGURE 5, Equation 1B indicates that the first positive $\omega_0 t$ intercept occurs at $$\tan^{-1}\left(\frac{I_c'}{\omega_0 Q}\right)$$

the second occurs at $$\pi + \tan^{-1}\left(\frac{I_c'}{\omega_0 Q}\right)$$

and symmetry indicates that another addition of $$\tan^{-1}\left(\frac{I_c'}{\omega_0 Q}\right)$$

yields $\omega_0 t_1$.

Therefore, $$\omega_0 T_1 = \pi + 2\tan^{-1}\frac{I_c'}{\omega_0 Q}$$

(11)
$$T_1 = \frac{\pi}{\omega_0} + \frac{2}{\omega_0}\tan^{-1}\frac{I_c'}{\omega_0 Q}$$

The period of oscillation is then $T = T_1 + T_2$.

The specific case for which the cryotron is biased exactly at the switching point, that is, $I_c = I_b$ or $I_c' - i_c' = 0$, is of special interest since the relative simplicity of the solution allows for clearer physical interpretation. In addition, much of the preceding general analysis is irrelevant to this case. There follows a general outline of the specific results for $I_c' = 0$.

(1C)
$$i_1 = -\omega_0 Q_0 \sin \omega_0 t$$

(5C)
$$i_2 = \left(\frac{\alpha}{\beta}2I_s + \frac{\omega_0^2}{\beta}Q_0\right)e^{-\alpha t}\sin\beta t$$

Note that (6A) is now trivial and (6B) is irrelevant. For this case, $$T_2 \text{ is } \frac{\pi}{\beta}$$

*not* a function of amplitude as it is in general.

$$Q_2 = Q_1 + \int_0^{\pi/\beta} i_2 dt = Q_1 + \Delta Q = -Q_0 + \Delta Q$$

(7A)
$$\Delta Q = \left[\frac{\alpha}{\omega^2}2I_s + Q_0\right]\left[1 + e^{-\left(\frac{\alpha}{\beta}\right)\pi}\right]$$

Again, the oscillation amplitude is building up if $Q_2 > Q_0$, stable if $Q_2 = Q_0$, and decaying if $Q_2 < Q_0$.

(12)
$$Q_2 = 2I_s\frac{\alpha}{\omega_0^2}\left(1 + e^{-\frac{\alpha}{\beta}\pi}\right) + Q_0 e^{-\frac{\alpha}{\beta}\pi}$$

$Q_2$ is a linearly increasing function of $Q_0$ in this case, facilitating a graphical picture of the buildup of oscillation. There is a positive $Q_2$ intercept, so a slope less than one is required for a point to exist where $Q_2 = Q_0$. The slope $$e^{-\frac{\alpha}{\beta}}$$

satisfied this condition since $\alpha/\beta$ is always positive. FIGURE 6 shows $Q_0$ and $Q_2$ each as a function of $Q_0$. The intersection is Q, the value of $Q_0$ for which the oscillation amplitude is stable. Inspection reveals that oscillation will grow toward this point if initially below, or decay toward it if initially above, and that no "hunting" can occur. The broken lines show the path of buildup in several successive cycles for an initial $Q_0$ value of E.

Analytically, from (12)

(13)
$$Q = 2I_s\frac{\alpha}{\omega_0^2}\left[\frac{1+e^{-\frac{\alpha}{\beta}\pi}}{1-e^{-\frac{\alpha}{\beta}\pi}}\right]$$

(14)
$$I_m^- = -\omega_0 Q = -2I_s\frac{\alpha}{\omega_0}\left[\frac{1+e^{-\frac{\alpha}{\beta}\pi}}{1-e^{-\frac{\alpha}{\beta}\pi}}\right]$$

Differentiation of (5C) shows that $I_m^+$ occurs at $$T_p = \frac{1}{\beta}\tan^{-1}\frac{\beta}{\alpha}$$

and has the value $$I_m^+ = \left(\frac{\alpha}{\omega_0}2I_s + \omega_0 Q\right)e^{-\frac{\alpha}{\beta}\tan^{-1}\frac{\beta}{\alpha}}$$

(15)
$$I_m^+ = (2I_s)\frac{\alpha}{\omega_0}\left[1 + \frac{1+e^{-\frac{\alpha}{\beta}\pi}}{1-e^{-\frac{\alpha}{\beta}\pi}}\right]e^{-\frac{\alpha}{\beta}\tan^{-1}\frac{\beta}{\alpha}}$$

$$= 2I_s\left[\frac{2\frac{\alpha}{\omega_0}}{1-e^{-\frac{\alpha}{\beta}\pi}}\right]e^{-\frac{\alpha}{\beta}\tan^{-1}\frac{\beta}{\alpha}}$$

The period is simply

(16)
$$T = \frac{\pi}{\omega_0} + \frac{\pi}{\beta}$$

The foregoing analysis has completely neglected resistive loading. In a typical cryogenic circuit the load, may be a cryotron control winding which is mostly inductive and which can be combined with L.

The following values are given as exemplary of an evaporated thin film tank circuit:

$L = 0.026$ microhenry
$C = 0.003$ microfarad so $\omega_0 = 1.13 \times 10^8$ radians/second
$f_0 = 18$ megacycles/second For critical damping, 6 ohms would be required.

Assume the gate is tin of 6,000 angstroms thickness at a temperature T equal to $0.9T_c$, $T_c$ being the critical temperature. Thus there is no time period involved in the expression. The relationship $$\frac{T}{T_c} = 0.9$$

is a relationship that is related to the thickness of tin. The critical field of the tin is on the order of 100 oersteds.

Assuming first a crossed-film cryotron with three crossings, a 3 mil wide control winding over an 18 mil wide gate.

Critical gate current=3.6 amperes
$R_g=1.5\times10^{-3}$ ohms
$\alpha=28.5\times10^3$
$\alpha/\omega_0=25.2\times10^{-5}$ To a good approximation, $\beta=\omega_0$ and $$\frac{\alpha}{\beta}=\frac{\alpha}{\omega_0}$$

For computational simplicity, $I_b=I_c$, so $I_c'=0$.

The circuit will be started from rest by introducing gate resistance transiently.

The first positive swing has the amplitude $$2I_s\frac{\alpha}{\omega_0}e^{-\frac{\alpha}{\beta}\tan^{-1}\frac{\beta}{\alpha}}\cong0.5\times10^{-3}I_s \text{ (amperes)}$$

The charge at the end of that swing is $$2I_s\frac{\alpha}{\omega_0}2\left(1+e^{-\frac{\alpha}{\beta}\pi}\right)\cong10^{-3}\frac{I_s}{\omega_0}\text{(coulombs)}$$

The next positive swing rises to $$\left(2I_s\frac{\alpha}{\omega_0}+\omega_0 10^{-3}\frac{I_s}{\omega_0}\right)e^{-\frac{\alpha}{\beta}\tan^{-1}\frac{\beta}{\alpha}}\cong1.5\times10^{-3}I_s$$

The stable value of charge is $$Q\cong1.25\frac{I_s}{\omega_0}$$

Finally $$I_m^+\cong1.25I_s$$
$$I_m^-\cong1.25I_s$$

Note that thousands of cycles would be required to build up to a value close to $I_m^+$.

Assuming next an in-line cryotron with a 9 mil wide control line and a gate one inch long:

Critical gate current=1.8 amperes
$R_g=0.33$ ohm
$\alpha=6.3\times10^6$
$\alpha/\omega_0=0.056$ Approximately, $\beta=\omega_0$, $$\frac{\alpha}{\beta}=\frac{\alpha}{\omega_0}$$

and again, $I_c'=0$ for convenience.

Start by transiently introducing $R_g$.

The amplitude of the first positive swing$\cong0.10I_s$.

The charge after the first positive swing $$\cong0.21\frac{I_s}{\omega_0}$$

The amplitude of the next positive swing$\cong0.29I_s$ $$Q\cong1.29\frac{I_s}{\omega_0}$$
$$I_m^+=1.29I_s$$
$$I_m^-=1.29I_s$$

The additional resistance of the in-line cryotron results in much faster buildup.

It should also be noted that the circuit of FIGURE 1 includes some inductance in sense with gate 20. This has not been treated in the analysis above since it does not affect the circuit when, as above, the operation is considered starting with the current $I_s$ flowing in gate 20. This inductance does produce a transient at the time $I_s$ is applied, which transient may be used to initiate oscillation.

Reference is made next to FIGURES 7 and 8 which illustrate cryogenic oscillators which employ a pair of cryotrons. Since the oscillator circuits of FIGURES 7 and 8 are similar, like reference numerals are employed to designate corresponding parts in each of the circuits. Referring more specifically to FIGURE 7, a source of current 40 is connected through a resistor 41 to a switch 42. The switch 42 is closed whenever source current $I_s$ is to be supplied to energize the oscillator circuit. Cryotrons 50 and 52, a tank circuit including capacitance 58 and inductance 60, and two bias sources 54 and 56 are connected as illustrated. A choke coil 62 is connected as shown to filter or prevent A.C. components of current from reaching the current source 40.

When the switch 42 is closed, the source current $I_s$ flows to a junction point 44. Current from the junction point 44 may flow through either the gate element 70 of the cryotron 50 or the gate element 72 of the cryotron 52. If the gate element 72 is resistive, current from the junction point 44 tends to flow through the gate element 70 of the cryotron 50 to a junction point 80, then through a control winding 76 of the cryotron 52 through the coil 60, the condenser 58 and a control winding 74 of the cryotron 50 to a junction point 82. The D.C. components of current are returned through the choke 62 to the source of current 40.

In case the gate element 70 of the cryotron 50 is resistive, current from the junction point 44 tends to flow through the gate element 72 of the cryotron 52 to the junction point 82, then through the control winding 74 of the cryotron 50 through the tank circuit including the condenser 58 and the winding 60 and through the control winding 76 of the cryotron 52 to the junction point 80. The D.C. components of current are returned through the choke 62 to the source of current 40.

The source current $I_s$ from the junction point 44 in FIGURE 7 is switched back and forth between the alternate parallel paths defined above by the tank current $i_t$ as the condenser 58 is charged and discharged, thereby providing oscillatory signals. It is pointed out that as the condenser 58 is charged and discharged in the oscillator circuits in FIGURES 7 and 8, a waveform with symmetrical positive and negative half cycles is provided, yielding more nearly sinusoidal waveforms.

The oscillator circuit in FIGURE 8 is similar in construction to the oscillator circuit in FIGURE 7 with the exception that a transformer 64 is employed in FIGURE 8 instead of a choke. The transformer 64 in FIGURE 8 has a primary winding 68 and a secondary winding 66 connected as shown. The current $I_s$ is returned via a center-tap connection on the primary winding 68 to the current source 40. The tank current $i_t$ through the condenser 58 and the winding 60 in FIGURE 8 has a waveform which is substantially sinusoidal and symmetrical for both positive and negative half cycles.

It is another feature of this invention to provide an oscillator which utilizes a transmission line as a frequency determining element. Reference is made to FIGURES 9 and 10 for a description of oscillator circuits of this type. Since these oscillator circuits are similar in construction, like reference numerals are employed to designate corresponding parts in FIGURES 9 and 10. Referring more specifically to FIGURE 9, a current source formed by battery 100 and a variable resistor 102 is connected to a switch 104. When the switch 104 is closed, current from the source 100 may flow to a junction point 106. Current source 100 and resistor 102 are large enough so that $I_s$ is substantially constant in spite of variations in gate voltage. Connected between the junction point 106 and ground is a gate element 108 of a cryotron 110. Also connected between the junction point 106 and ground is a transmission line including a superconductive ground plane 112 and a superconductive conductor 114 as shown. The transmission line is a one-quarter wave length line which is open at one end, and it has the gate element 108 of the cryotron 110 connected across the opposite end. A bias source of current 116 is connected through a variable resistor 118 to ground. Current from the bias source 116 flows along a conductor 120 to ground, and this current creates a magnetic field on the gate element 108 of the cryotron 110. The line 120 serves as a bias control winding for the cryotron 110. Current through that portion of the conductor 114 adjacent the gate element 108 of the cryotron 110 establishes a magnetic field on the gate element 108, and that portion of the conductor 114 in the region of the gate element 108 serves as the control winding for the cryotron 110. The magnetic fields produced on the gate element 108 by current in the lines 114 and 120 control whether or not the gate element 108 is driven resistive or remains in a superconductive state. The bias current is employed to insure that the gate element 108 is driven resistive at some time during the proper half cycle of oscillation.

The operation of the oscillator circuits in FIGURES 9 and 10 may best be understood in terms of the traveling waves shown in FIGURE 11. Let it be assumed that the oscillator circuit in FIGURES 9 and 10 is originally in a quiescent condition, that current $I_s$ flows through the superconductive gate 108 and that the transmission line is uncharged. Next a current pulse temporarily is applied to the bias field, by means not shown or by reducing the value of the variable resistor 118, to drive resistive the gate element 108. When resistance appears, a voltage is developed across the left end or input terminals of the transmission line. This voltage transient starts to propagate on the line. Associated with the voltage wave is a positive current wave. Since the amplitude of the current wave is sufficient to maintain resistance as it passes through the conductor 114 over the cryotron gate element 108, the starting pulse of current applied to the bias field may be removed; in case a current source, not illustrated, is employed for this purpose, the current pulse from that source is terminated; or in case the resistor 118 has been changed to a lower value, the value of the resistor 118 is increased until the bias current from the source 116 is reduced to a desired value. The current wave is propagated as illustrated in FIGURE 11*a* toward the open end of the transmission line where it is inverted and reflected at the open end of the transmission line and propagated back toward the input section of the transmission line as illustrated in FIGURE 11*b*. The gate element 108 reverts to its superconductive state as the current in the transmission line passes through that portion of the control winding disposed over the gate element 108. An additional negative unit of current appears on the line due to the disappearance of the gate voltage. When the current in the transmission line reaches the gate element 108, it encounters a short circuit because the gate element has been restored to its superconductive state, and the current is reflected without a phase reversal. The wave front of FIGURE 11*c* including the new negative unit, now travels toward the open end of the transmission line. The gate element 108 remains in the superconductive state because the magnetic field of the bias source 116 opposes the magnetic field of the negative wave on the transmission line in the region of the gate element 108, and the net magnetic field is less than the critical magnetic field of the gate element 108. The wave front is reflected with a phase reversal at the open end of the transmission line, and it travels back toward the shorted end, as illustrated in FIGURE 11*d*, where it is again reflected without a phase reversal as illustrated in FIGURE 11*e*. This time as the wave front passes through the control winding over the gate element 108, the bias magnetic field aids the magnetic field produced by current in the transmission line, and the gate element 108 is driven resistive; whereupon, an additional component of current is added to the transmission line, and it travels along with the first wave as illustrated in FIGURE 11*f*. The process repeats itself and the oscillations continue to grow until one of two limiting factors occur. When either the current in the gate element 108 goes negative or the gate element 108 is driven resistive during both half cycles of oscillation, the oscillator will no longer build up amplitude, but it will continue to operate in a steady state manner. The wave shape of current through the control winding of the cryotron 110 and voltage across the open end of the transmission line are illustrated in FIGURES 12*a* and 12*b*, respectively. It is pointed out that one oscillation cycle is represented by two "round trips" on the transmission line. Therefore, the time required for a wave to travel one length of the transmission line is one quarter or an oscillation period. By using an insulation material with a relative dielectric constant of 4, a 1K mc. oscillator can be made with a line 3.75 cm. in length.

An exact mathematical analysis demonstrating the validity of the operation of the oscillator circuit illustrated in FIGURES 9 and 10 is somewhat complicated and involved. A simple analysis of the oscillator circuit illustrated in FIGURES 9 and 10 can be made if certain assumptions are made. A semigraphical analysis is made at this point, neglecting conductance loss in the transmission line and signal attenuation as it passes through the resistive gate. It is also assumed that there is an instantaneous switching of the gate element 108 from its superconductive state to the resistive state or vice versa. Other assumptions are pointed out during the course of the analysis. A typical cryotron gain curve is assumed, and the characteristic gain curve for a crossed-film cryotron and an in-line cryotron are illustrated in FIGURE 13*a* and FIGURE 13*b* respectively. A straight line approximation of the gain curve characteristic is illustrated in FIGURE 13*c* and FIGURE 13*d* for the respective crossed-film cryotron and in-line cryotron. The straight line approximation is given by the following equations:

(17) $$I_g = G_1(I_{ce} + I_{cc})$$

(18) $$I_g = -G_2(I_{ce} - I_{cc})$$

where $I_g$=gate current $-I_{ce}$=sum of transmission line current at the cryotron control winding and the bias current $G_1$ and $G_2$=gain factors $I_{cc}$=intercept of the gain curve with the $I_{ce}$ axis Equations 17 and 18 apply to either the in-line or crossed-film cryotron. For the in-line case $$G_1 > 1,\ G_2 < 1$$

and for the crossed-film case $$G_1 = G_2 > 1$$

The analysis is carried out in such a way that the various currents may be measured from the actual gain curve or may be approximated by the straight line characteristic.

From FIGURE 13, current continuity requires that

(19) $$I_s = i_c + I_g$$

where $i_c$ is the current in the control winding part of the transmission line and $I_s$ is the current from source 100.

The total current equivalent of the control field is the sum of $i_c$, and the bias current $I_b$, and in the quadrant used

(20) $$I_{ce} = -(i_c + I_b)$$

Therefore the load line may be defined

(21) $$I_g = I_{ce} + I_b + I_s$$

The intersection of the load line and the gain characteristic determine the locus of operation.

The intersection occurs at points E and F as shown in FIGURES 13(d). Also the load line intersects the $I_{ce}$ axis at point 0.

The control current at intersection F is $$I_{ce}(F)=\frac{I_b+I_s-G_1I_{cc}}{G_1-1} \tag{22}$$

The control current of E is $$I_{ce}(E)=\frac{G_2I_{cc}-I_b-I_s}{G_2+1} \tag{23}$$

and at O is $$I_{ce}(O)=-(I_b+I_s) \tag{24}$$

The operating mode of interest is that which starts in the superconducting phase and then follows the load line in the direction of decreasing gate current into the normal region. It is at once apparent that since the load line has a slope of unity, this mode of operation is feasible only with a gain $G_1$ greater than unity.

Assume a start at the quiescent point P where ($I_g=I_s$, $I_{ce}=-I_b$). Assume that suddenly the gate 108 is driven resistive. A voltage $I_gR_g$, where $R_g$ is the gate resistance, is applied to the transmission line terminals and a current wave of amplitude $$\frac{I_gR_g}{Z_o}$$

where $Z_o$ is the transmission line characteristic impedance, starts to propagate. From Equation 19, the current entering the transmission line is $$i_c=\frac{I_s}{1+Z_o/R_g} \tag{25}$$

If this current wave is to be of sufficient amplitude to keep the gate resistive, it is necessary that $$\left|\frac{I_s}{1+Z_o/R_g}\right|\geq|I_{ce}(F)|-I_b \tag{26A}$$

or using the straight line gain curve $$\left|\frac{I_s}{1+Z_o/R_g}\right|\geq\frac{G_1(I_{cc}-I_b)-I_s}{G_1-1} \tag{26B}$$

The requirements of Equation 26 are necessary but not sufficient to build up oscillation. In order to set further requirements, end conditions on the transmission line must be specified. Up until now reference has been made to an unloaded oscillator or one in which the far right end of the transmission line is truly an open circuit. In this case Equation 26 is sufficient to describe buildup conditions. In practice, however, a load will be placed on the oscillator, probably at the far end of the line. Let us assume that this load is a pure resistance, $R_e$. The reflection coefficient K at the far end of the line is then $$|K|=\frac{R_e-Z_o}{R_e+Z_o} \tag{27}$$

where we assume $R_e>Z_o$.

The current wave will be reflected twice from the load end before it will once again be required to produce a super-to-normal phase transition. The result when Equation 26 is modified to account for loading is that $$|K|^2\frac{I_s}{1+Z_o/R_g}\geq|I_{ce}(F)|-I_b \tag{28A}$$

and $$|K|^2\frac{I_s}{1+Z_o/R_g}\geq\frac{G_1(I_{cc}-I_b)-I_s}{G_1-1} \tag{28B}$$

Combining Equations 27 and 28 the starting conditions under load may be expressed as $$\frac{I_s}{1+Z_o/R_g}>(I_{ce}(F)-I_b)\left(\frac{R_e+Z_o}{R_e-Z_o}\right)^2 \tag{29A}$$

$$\frac{I_s}{1+Z_o/R_g}>\left[\frac{G_1(I_{cc}-I_b-I_s}{G_1-1}\right]\left[\frac{R_e+Z_o}{R_e-Z_o}\right]^2 \tag{29B}$$

Equation 29 seems to indicate that it is theoretically possible to compensate for almost any load resistor greater than (but not equal to) $Z_o$ by adjusting the bias. Practically, a limit exists on just how close the bias may be set near the gain curve; a difference of a few micro amperes between $I_{ce}(F)$ and $I_b$ may not be feasible.

Equation 29 can also be used to determine the minimum value that $R_e$ can have and yet allow oscillation to begin with a given set of parameters.

The minimum load that can be used under given conditions is $$Re>Z_o\frac{\sqrt{\dfrac{I_s}{\dfrac{I_{ce}(F)-I_b}{1+Z_o/R_g}}+1}}{\sqrt{\dfrac{I_s}{\dfrac{I_{ce}(F)-{}_b}{1+Z_o/R_g}}-1}} \tag{30}$$

The assumption of instantaneous switching of the gate implies that the steps in the buildup of current will be of uniform amplitude. In practice this does not happen and the steps of additional current will tend to decrease during the buildup.

The amplitude will continue to increase until one of the limiting actions takes place. The maximum amplitude, S, possible under conditions of limiting at point E is $$S(E)=|I_b|-|I_{ce}(E)| \tag{31a}$$

or $$S(E)=\frac{G_2(I_b+I_{cc})-I_s}{G_2+1} \tag{31B}$$

The amplitude obtainable for limiting at point O is $$S(O)=|I_{ce}(O)|-I_b=I_s \tag{32}$$

A large swing may be obtained by selecting an operating point such that $$S(E)=S(O)=I_s \tag{33}$$

This point is defined by $$I_s=I_b-|I_{ce}(E)| \tag{34a}$$

or $$I_s=\frac{G_2(I_b+I_{cc})}{G+2} \tag{34B}$$

The number of cycles required to build up to steady-state oscillation can be found approximately by dividing the final amplitude by the current addition per step.

Thus when operating according to the conditions specified by Equation 33, the number of cycles, *n*, is given approximately by $$n\approx\frac{1}{2}\left[1+\frac{Z_o}{R_g}\right] \tag{35}$$

The power that the oscillator delivers to the load is given by $$P_{out}=\tfrac{1}{2}(1-|K|)^2S^2R_e \tag{36}$$

which under the conditions specified by Equation 33 is $$P_{out}=2I_s^2Z_o\frac{Z_o/R_e}{(1+Z_o/R_g)^2} \tag{37}$$

A possible source of trouble is having a nonuniform wave front of current propagating on the transmission line. This arises since there is a phase difference between the current wave reflected from the superconducting gate and the additional step of current produced when the gate switches resistive. To minimize this effect it is necessary to keep the distance between the gate-ground connection and the control line down to a minimum. This length of line is longer in the case of an in-line cryotron than in the crossed-film cryotron. The effect is accentuated further by the finite time required for resistance to appear. Both of these difficulties may contribute to the ultimate frequency limitation of this device.

Another problem that may arise is the presence of mismatches caused by discontinuities in the transmission line. Calculations show that within the expected range of discontinuities, the additional reflections have negligible effect.

An oscillator was designed with the following dimensions.

| | |
|---|---|
| Cryotron | In-line. |
| Gate | Indium—4000 A., 0.009×3/16". |
| $R_g$ | 0.054 ohm. |
| Bias field | 116 oersteds. |
| $I_s$ | 0.280 amp. |
| $T/T_c$ | 0.840. |
| Gain ($G_1$) | 4. |
| $I_{cc}(f)—I_b$ | 0.0125 amp. |
| Transmission line: | |
| $Z_o$ | 0.432 ohm. |
| Velocity | $C/2$. |
| Length | 2½". |
| $\frac{I_sR_g}{R_g+Z_o}$ | 0.031 amp. |
| Oscillator: | |
| Frequency | 0.57K mc. |
| Amplitude | 0.255 amp. |
| Minimum $R_e$ | 2 ohms. |
| Power out: | |
| $R_e$ | 50 ohms; 0.49 milliwatt. |
| $R_e$ | 300 ohms; 0.08 milliwatt. |
| Dissipation in the gate element | $\frac{1}{2}I_s^2R_g$=2.1 milliwatts. |

A glass substrate is not useable with this high dissipation level since the temperature rise increases the operating temperature to greater than .90 percent of the critical temperature. At this high operating temperature there is little or no gain, and furthermore, the gate element is always resistive at the operating current levels. To circumvent this, a high thermal conductivity substrate is required, such as sapphire or aluminum.

While the invention has been particularly shown and described with reference to preferred embodiments thereof, it will be understood by those skilled in the art that various changes in form and details may be made therein without departing from the spirit and scope of the invention.

What is claimed is:

1. An oscillator circuit including a cryotron having a gate and a control winding, a capacitor and an inductor connected in series with the control winding, said gate being connected in parallel with the series circuit including the control winding, the capacitor and the inductor, a source of current connected across said gate, and a source of bias current connected across said control winding.

2. An oscillator circuit including a cryotron having a gate and a control winding, a series circuit connected across said gate, said series circuit including said control winding and a frequency determining circuit, a source of current connected across said gate, and a magnetic bias means coupled to said gate.

3. The apparatus of claim 2 wherein the frequency determining circuit is a condenser and a coil.

4. The apparatus of claim 2 wherein the frequency determining circuit is a transmission line.

5. An oscillator including a cryotron having a gate and a control winding, a source of current and a transmission line having distributed line properties connected in series with said control winding, said gate being connected to said transmission line and control winding, and a bias means coupled to said gate.

6. The apparatus of claim 5 wherein said transmission line is a one-quarter wavelength line having one end open and said control winding in series with the end opposite the open end and the gate across both the line and control winding.

7. The apparatus of claim 6 wherein said cryotron is an in-line cryotron.

8. The apparatus of claim 6 wherein said cryotron is a cross-film cryotron.

9. A superconductive oscillator having a source of current, first and second cryotrons each having a gate element and a control winding disposed thereon, the gate elements of said cryotrons being connected across said source of current, a condenser and a coil connected between one end of the control winding of the first cryotron and one end of the control winding of the second cryotron, a return path connecting the opposite ends of the control windings of the first and second cryotrons to said source of current, and magnet bias means coupled to the gate elements of said first and second cryotrons.

10. The apparatus of claim 9 wherein the magnetic bias means includes first and second sources of current connected across the respective control windings of said first and second cryotrons.

References Cited by the Examiner

UNITED STATES PATENTS

| | | | |
|---|---|---|---|
| 2,725,474 | 11/1955 | Ericsson et al. | 331—107 |
| 2,832,897 | 4/1958 | Buck | 331—107 |
| 2,944,167 | 7/1960 | Matare | 331—107 |
| 3,011,133 | 11/1961 | Koenig et al. | 331—107 |

ROY LAKE, *Primary Examiner.*